United States Patent
Valecha et al.

(10) Patent No.: US 10,387,210 B2
(45) Date of Patent: Aug. 20, 2019

(54) RESOURCE SCHEDULE OPTIMIZATION

(71) Applicant: International Business Machines Corporation, Armonk, NY (US)

(72) Inventors: Vinod A. Valecha, Pune (IN); Justin A. Zamora, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/089,864

(22) Filed: Apr. 4, 2016

(65) Prior Publication Data

US 2017/0286175 A1    Oct. 5, 2017

(51) Int. Cl.
    *G06F 9/455*    (2018.01)
    *G06F 9/50*     (2006.01)

(52) U.S. Cl.
    CPC ........ *G06F 9/5077* (2013.01); *G06F 9/45558* (2013.01); *G06F 9/5027* (2013.01); *G06F 2009/4557* (2013.01)

(58) Field of Classification Search
    CPC .................................................. G06F 9/45533
    USPC ........................................................ 718/1
    See application file for complete search history.

(56) References Cited

U.S. PATENT DOCUMENTS

| | | | |
|---|---|---|---|
| 8,954,982 B2 * | 2/2015 | Da silva | G06F 9/5077 709/226 |
| 2006/0173885 A1 * | 8/2006 | Moir | G06F 9/466 |
| 2006/0179278 A1 * | 8/2006 | Suzuoki | G06F 8/52 712/209 |
| 2007/0010987 A1 * | 1/2007 | Guenthner | G06F 9/30174 703/26 |
| 2007/0234358 A1 * | 10/2007 | Hattori | G06F 9/45533 718/1 |
| 2009/0172063 A1 * | 7/2009 | Chirilov | G06F 17/246 708/441 |
| 2009/0235273 A1 * | 9/2009 | Petersen | G06F 9/524 718/106 |
| 2009/0307519 A1 * | 12/2009 | Hyatt | G06F 1/3203 713/502 |
| 2010/0205411 A1 * | 8/2010 | Lunteren | G06F 17/30985 712/222 |
| 2011/0072138 A1 | 3/2011 | Canturk et al. | |

(Continued)

OTHER PUBLICATIONS

Ennals, Robert J., "Adaptive evaluation of non-strict programs", University of Cambridge Computer Laboratory, Technical Report, Aug. 2008, Cambridge, United Kingdom, © 2008 Robert J. Ennals, 244 pages.

(Continued)

*Primary Examiner* — Mehran Kamran
(74) *Attorney, Agent, or Firm* — Brian M. Restauro (57) ABSTRACT

Embodiments of the present invention provide methods, computer program products, and systems for evaluating expressions. Embodiments of the present invention can be used to receive a set of program instructions to be evaluated in a virtualized environment and determine an evaluation strategy based, at least in part, on an availability of CPU resources. The CPU resource include resources impacted by use of virtual machines and hypervisors. Embodiments of the present invention can, responsive to determining that there are sufficient CPU resources available, evaluate the set of program instructions according to the evaluation strategy using the CPU resources.

17 Claims, 7 Drawing Sheets

(56) References Cited

U.S. PATENT DOCUMENTS

| | | | | |
|---|---|---|---|---|
| 2011/0173420 | A1* | 7/2011 | Chen | G06F 9/3851 712/220 |
| 2013/0046957 | A1* | 2/2013 | Tran | G06F 9/30087 712/208 |
| 2013/0198499 | A1* | 8/2013 | Dice | G06F 9/30079 712/239 |
| 2014/0082625 | A1* | 3/2014 | Busaba | G06F 9/38 718/104 |
| 2014/0281274 | A1* | 9/2014 | Pokam | G06F 9/3834 711/145 |
| 2014/0337849 | A1* | 11/2014 | Seo | G06F 9/46 718/102 |
| 2015/0020073 | A1* | 1/2015 | Domsch | G06F 9/45558 718/1 |
| 2015/0100965 | A1* | 4/2015 | Tran | G06F 9/5011 718/103 |
| 2015/0286261 | A1* | 10/2015 | Bose | G06F 1/324 713/322 |
| 2016/0062797 | A1* | 3/2016 | Holt | G06F 9/4881 718/108 |
| 2016/0092265 | A1* | 3/2016 | Kogan | G06F 9/4843 718/102 |
| 2016/0224360 | A1* | 8/2016 | Wagner | G06F 9/45558 |
| 2017/0139711 | A1* | 5/2017 | Greiner | G06F 9/30072 |

OTHER PUBLICATIONS

Faxen, Karl-Filip, "Cheap Eagerness: Speculative Evaluation in a Lazy Functional Language", ICFP '00, vol. 35 Issue 9, Sep. 2000, Montreal, Canada, Copyright 2000 ACM, pp. 150-161.

Friedman et al., "Cons should not evaluate its arguments", Automata Languages and Programming Third International Colloquium (Edinburgh University Press), Jul. 1976, pp. 256-284.

Guan et al., "Workload-Aware Credit Scheduler for Improving Network I/O Performance in Virtualization Environment", IEEE Transactions on Cloud Computing, vol. 2, No. 2, Apr.-Jun. 2014, pp. 130-142.

IBM, "Method and System for Resource Allocation and Scheduling of Virtual Resources", An IP.com Prior Art Database Technical Disclosure, Original Publication Date: Feb. 16, 2010, IP.com No. 000193249, 2 pages.

Mell et al., "The NIST Definition of Cloud Computing", National Institute of Standards and Technology, U.S. Department of Commerce, Special Publication 800-145, Gaithersburg, Maryland, Sep. 2011, 7 pages.

"Collaborative Scheduling", An IP.com Prior Art Database Technical Disclosure, Authors et. al.: Disclosed Anonymously, IP.com No. 000240244, 8 pages.

* cited by examiner

RESOURCE SCHEDULE OPTIMIZATION

BACKGROUND

This invention relates generally to the field of virtualized environments, and more particularly to opportunistic evaluation of programs in virtualized environments.

Generally, evaluation strategies determine when code should be put into a processor queue to be turned into a value. Execution strategies take code from the processor queue and determine the best way to execute the code by CPUs. Two common strategies used by programming languages for evaluating programs include strict and delayed evaluation. Strict evaluation evaluates expressions immediately and returns the result whereas delayed evaluation returns a "promise" to evaluate the expression later. A promise encapsulates everything that is needed to perform the computation at a later time. As an entire program is evaluated, promises can stack up and be nested in a tree that corresponds to the structure of the program. When the evaluation reaches the point that an actual value is required, then a special operation referred to as "force" is used. The force operator causes the computation contained within the promise to be evaluated. In instances where an expression contains many or nested promises, multiple force operations may be required to obtain a final value.

SUMMARY

Embodiments of the present invention provide methods, computer program products, and systems for evaluating expressions. In one embodiment of the present invention, a computer-implemented method is provided comprising: receiving a set of program instructions to be evaluated in a virtualized environment; determining an evaluation strategy based, at least in part, on an availability of CPU resources, wherein the CPU resources include resources impacted by use of virtual machines and hypervisors; and responsive to determining that there are sufficient CPU resources available, evaluating the set of program instructions according to the evaluation strategy using the CPU resources.

DETAILED DESCRIPTION

Embodiments of the present invention recognize the inefficient use of resources in virtualized environments. For example, in a virtualized environment, with several virtual machines (VMs) managed by a hypervisor, the hypervisor is aware of CPU usage (e.g., the number of hardware CPUs and how they are utilized) but is generally unaware of how each VM is using its CPU and how the CPU workload is allocated among the processes running on each respective VM. Conversely, each respective VM is aware of how its own processes are using the CPU but has no knowledge of other VMs running on the hardware or how they might be using the CPU. Thus, scenarios where one VM uses CPU heavily while the rest of the hardware is idle might occur. Embodiments of the present invention provide efficient solutions for making a compiler/interpreter aware of dynamic CPU activity to enable a more efficient use of resources. In this manner, as described in greater detail later in the specification, embodiments of the present invention introduces the concept of forcing evaluation based, at least in part, on current system load, and availability of system resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
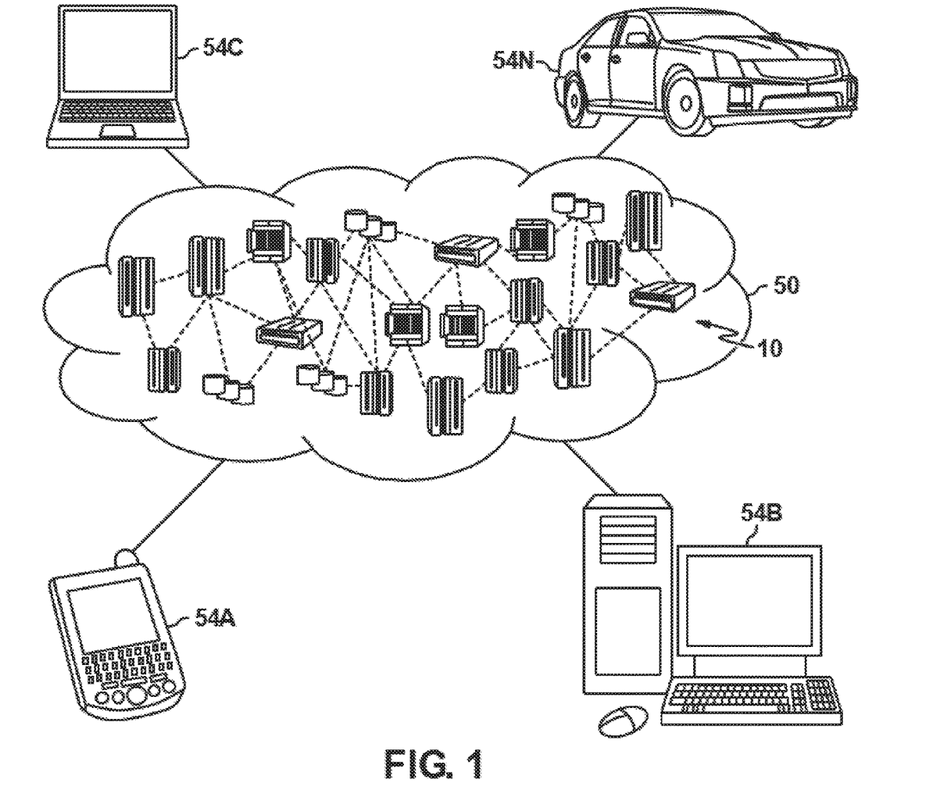
FIG. 1 depicts a cloud computing environment, in accordance with an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
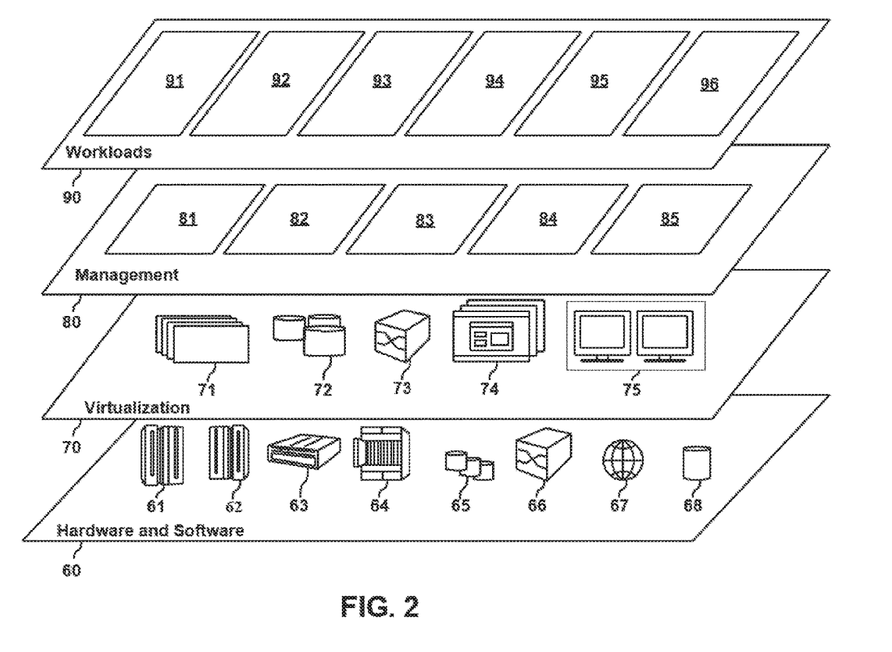
FIG. 2 depicts abstraction model layers, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise application 96. Some example embodiments of the present invention will be described in the following paragraphs.

Figure 3:
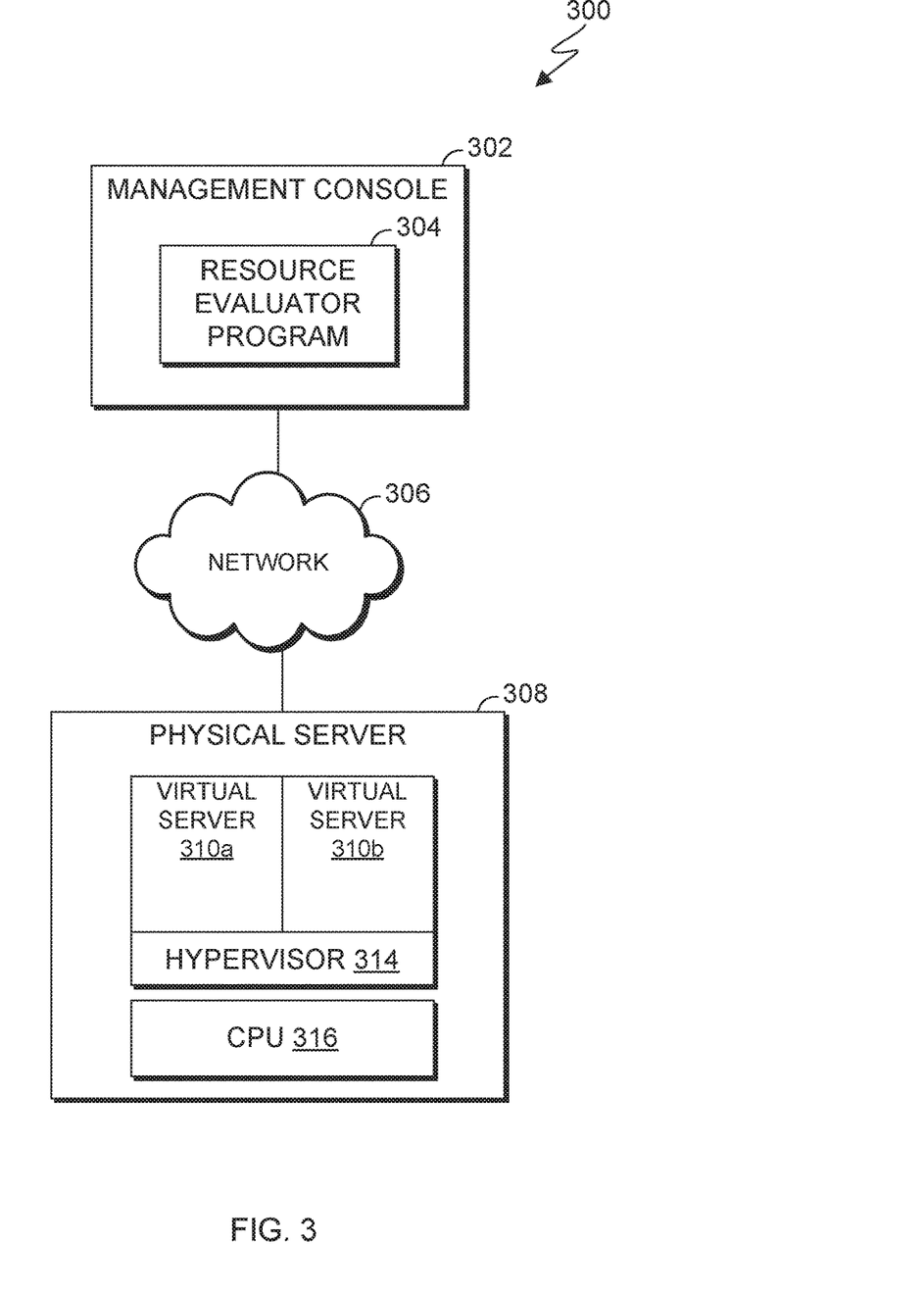
FIG. 3 is a block diagram of a computing environment, in accordance with an embodiment of the present invention.

FIG. 3 is a functional block diagram of computing environment 300, in accordance with an embodiment of the present invention. Computing environment 300 includes management console 302 and physical server 308. Management console 302 and physical server 308 can be desktop computers, laptop computers, specialized computer servers, or any other computer systems known in the art. In certain embodiments, management console 302 and physical server 308 represent computer systems utilizing clustered computers and components to act as a single pool of seamless resources when accessed through network 306. For example, such embodiments may be used in data center, cloud computing, storage area network (SAN), and network attached storage (NAS) applications. In certain embodiments, management console 302 and physical server 308 represent virtual machines. In general, management console 302 and physical server 308 are representative of any electronic devices, or combination of electronic devices, capable of executing machine-readable program instructions, as described in greater detail with regard to FIG. 7.

Management console 302 includes resource evaluator program 304. Resource evaluator program 304 forces evaluations based, at least in part on current system load and availability of system resources, as described in greater detail with regard to FIGS. 2-4. For example, resource evaluator program 304 can determine when CPU resources (or other performance-related resource such as memory, network throughput, I/O, application response time, etc.) are low and opportunistically force evaluation of an expression or subexpression to take advantage of idle CPU cycles. Likewise, if resource evaluator program 304 determines that CPU (or other performance-related resource) load is high, resource evaluator program 304 can delay evaluation until a more opportune time. For illustrative purposes, resource evaluator program 304 is depicted as being a part of management console 302. However, it should be understood that resource evaluator program 304 can run on one or more other components of computing environment 300 (e.g., physical server 308, virtual server 310a, or virtual server 310b).

Network 306 can be, for example, a local area network (LAN), a wide area network (WAN) such as the Internet, or a combination of the two, and include wired, wireless, or fiber optic connections. In general, network 306 can be any combination of connections and protocols that will support communications between management console 302 and physical server 308, in accordance with a desired embodiment of the invention.

Physical server 308 includes virtual server 310a and 310b, hypervisor 314, and CPU 316. In general, CPU 316 is representative of any electronic device capable of executing machine-readable program instructions. In some embodiments, CPU 316 may be a collection of CPUs.

Hypervisor 314 creates and manages virtual server 310a and 310b and can be implemented with any suitable hypervisor and as part of any suitable virtualization infrastructure that is compatible with resource evaluator program 304 and CPU 316, in accordance with embodiments of the present invention. Hypervisor 314 is aware of resource utilization on the physical server (e.g., physical server 308) and is capable of reporting information about resource availability to resource evaluator program 304.

It should be understood that, for illustrative purposes, FIG. 1 does not show other computer systems and elements which may be present when implementing embodiments of the present invention. For example, while FIG. 1 shows a management console 302 and a single physical server 308, computing environment 300 can also include additional management consoles, physical servers, and virtualization servers that use resource evaluator program 304.

Figure 4:
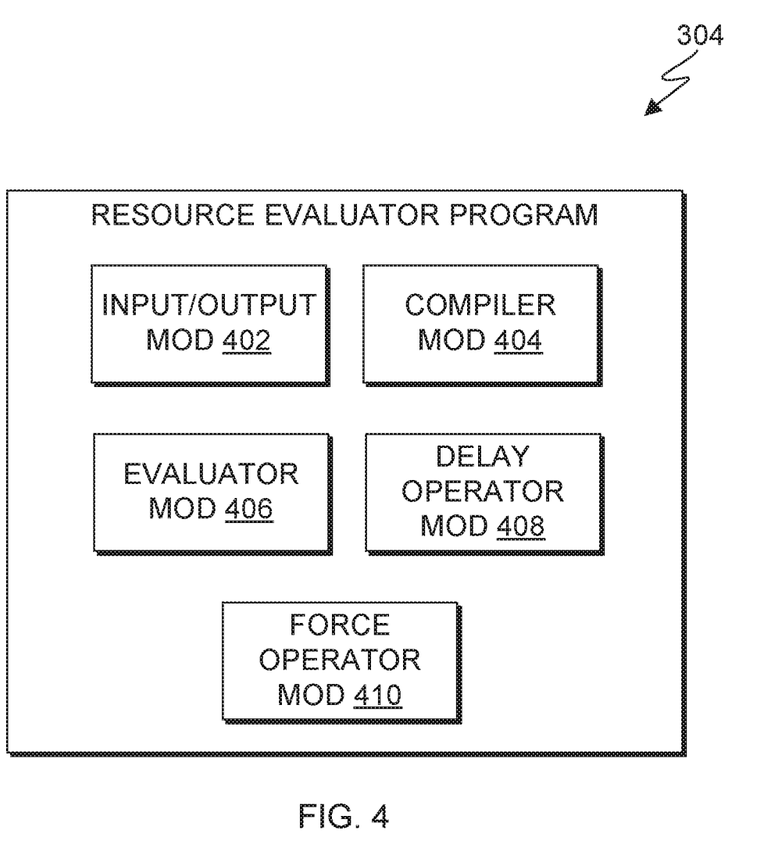
FIG. 4 is a block diagram showing a machine logic (for example, software) portion in accordance with an embodiment of the present invention.

FIG. 4 is a block diagram showing a machine logic (for example, software) portion in accordance with an embodiment of the present invention.

Resource evaluator program 304 includes input/output mod 402, compiler mod 404, language run time mod 206, delay operator mod 408, and force operator mod 410. Input/output mod 402 receives inputs from one or more components of computing environment 300 (e.g., from hypervisor 314) and transmits outputs from evaluator mod 406.

Compiler mod 404 can be a computer program that transforms source code written in a program language (e.g., source language) into another program language (e.g., target language). In general, compiler mod 404 can be implemented with any combination of software capable of transforming source code to an executable program.

Evaluator mod 406 determines an evaluation strategy for when to evaluate arguments of a function call and what kind of value to pass to the function. In this embodiment, evaluator mod 406 employs an opportunistic evaluation strategy. An opportunistic evaluation strategy, as used herein, refers to an evaluation strategy that either forces an evaluation or delays an evaluation based, at least in part, on current system load and availability of system resources when determining when to perform evaluations. For example, evaluator mod 406 can determine when CPU is low and opportunistically force evaluation of an expression or subexpression to take advantage of idle CPU cycles. Conversely, responsive to determining that CPU load increases, evaluator mod 406 can delay evaluation until more resources are available for processing.

In this embodiment, where evaluator mod 406 determines that a delayed evaluation strategy is appropriate, delay operator mod 408 returns a data structure referred to as a "promise". A "promise" as used herein, refers to a set of instructions to encapsulate everything that is needed to perform the computation at a later time. In other words, a "promise" can be a data structure that stores an expression so that the expression can be evaluated later. For example, an expression can be a mathematical equation such as the expression "3+2". Normally, the expression "3+2" would evaluate to "5". In this example, evaluator mod 406 has determined that the CPU does not have the resources to perform the evaluation. Responsive to receiving an indication from evaluator mod 406 that the CPU does not have the resources to perform the evaluation of the expression "3+2" delay operator mod 408 can create a promise the following data structure: "Promise[3+2]". Accordingly, delay operator mod 408 can then pass the promise data structure when evaluator mod 406 determines that CPU resources are available or if the expression is needed.

Force operator mod 410 receives one or more inputs from one or more modules of resource evaluator program 304 (e.g., evaluator mod 406, delay operator mod 408, etc.) and performs "force" operations. In this embodiment, force operator mod 410 "forces" computation of output received from evaluator mod 406. For example, where evaluator mod 406 transmits a "promise" to force operator mod 410, force operator mod 410 causes the computation contained within the promise to be evaluated immediately. Continuing the example above, evaluator mod 406 can transmit the expression "3+2" to force operator mod 410. Responsive to receiving the expression from evaluator mod 406, force operator mod 410 can "force" an evaluation of the expression and return the result of "5".

Figure 5:
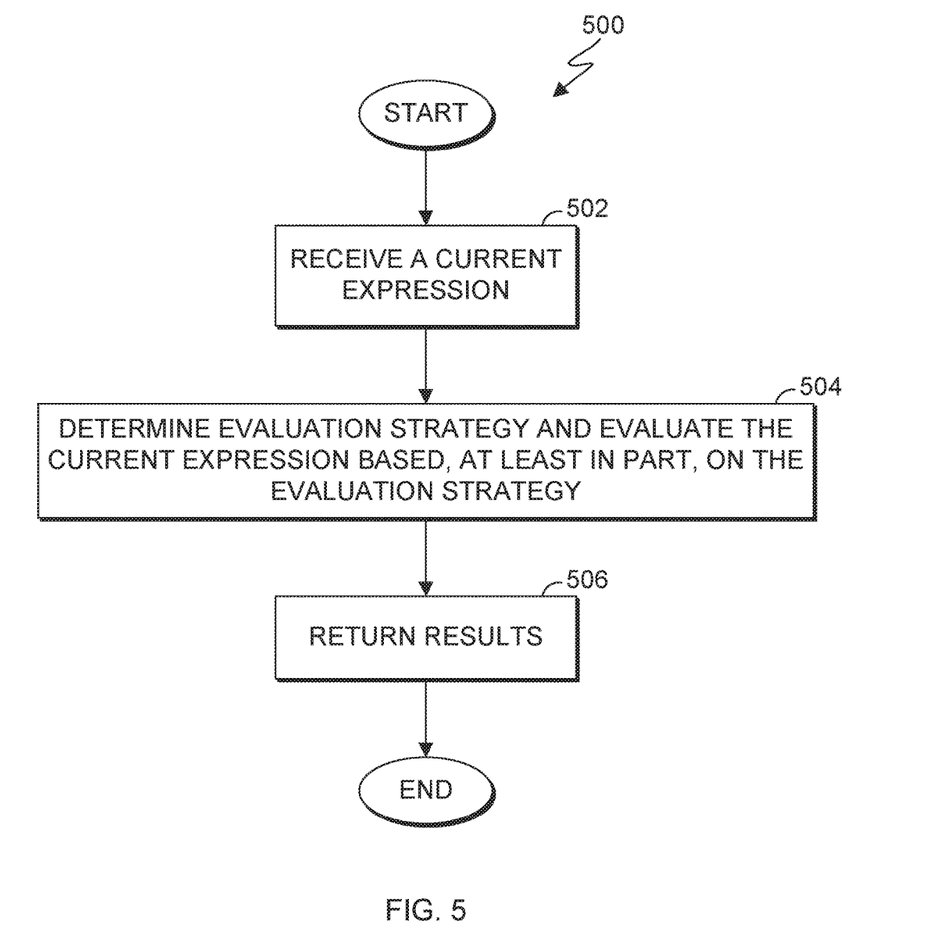
FIG. 5 is a flowchart illustrating operational steps for evaluating expressions, in accordance with an embodiment of the present invention.

FIG. 5 is a flowchart 500 illustrating operational steps for evaluating expressions, in accordance with an embodiment of the present invention.

In step 502, input/output mod 402 receives a current expression to be evaluated. In this embodiment, input/output mod 402 receives a current expression to be evaluated from virtual server 310a. In other embodiments, input/output mod 402 can receive a current expression to be evaluated from one or more other components of computing environment 300.

In step 504, evaluator mod 406 determines an evaluation strategy and evaluates the current expression based, at least in part, on the evaluation strategy. In this embodiment, evaluator mod 406 determines an evaluation strategy based, at least in part, on current system load and availability of system resources when determining when to perform evaluations, as discussed in greater detail with regard to FIG. 6.

In step 506, evaluator mod 406 returns results of the evaluation. In this embodiment, a result can be a computed value, a first level operation and promise to evaluate the remainder of the expression, or a promise to evaluate the complete expression later.

In instances, where evaluator mod 406 determines there are enough resources to force an evaluation, force operator mod 410 can compute the expression and the result returned can be the evaluated expression. For example, where the expression is "3+4" can be compiled to a function call, OpportunisticAdd(3, 4). At run-time, the function OpportunisticAdd checks the available resources. If there are enough resources available, force operator mod 410 adds the operands (e.g., 3 and 4) and returns the result "7". If there are not enough resources, then delay operator mod 408 can return a promise data structure that can be evaluated later using force operator mod 410.

In instances where evaluator mod 406 determines that there are not enough resources to force an evaluation, evaluator mod 406 can delay an evaluation. For example, the expression "3+4" can be a part of a larger expression "2+(3+4)". This could be compiled to OpportunisticAdd(2, OpportunisticAdd(3, 4)). In this example, resources are low when the expression is presented for evaluation. A promise data structure is created (e.g., Promise[Add, 3, 4]). The resulting expression thus becomes OpportunisticAdd(2, Promise[Add, 3, 4]). This expression can then be presented for evaluation. If resources become available, force operator mod 410 can perform a "force" operation on the promise data structure resulting in the value of "7". Accordingly, the resulting expression is OpportunisticAdd(2, 7) which can then be presented for evaluation as previously described.

Where evaluator mod 406 determines not to force an operation but there are resources to evaluate, evaluator mod 406 can evaluate a first level of operation and return a promise to evaluate the remainder of the expression. For example, this scenario arises in instances where there are nested expression, there may not be enough resources to evaluate the entire expression. Accordingly, one part (i.e., level) of the expression is evaluated now, and the rest is delayed (i.e., returned as a promise) to be evaluated later. For example, in an expression such as "(3+2)*(7−5)", there might be enough resources for the first part (e.g., the addition of (3+2) but not the rest. Accordingly the first-level result would be Promise[Multiply, 5, Promise[Subtract, 7, 5]]. As evaluation continues, and resources become available, more promises can be forced until a final result is reached.

Figure 6:
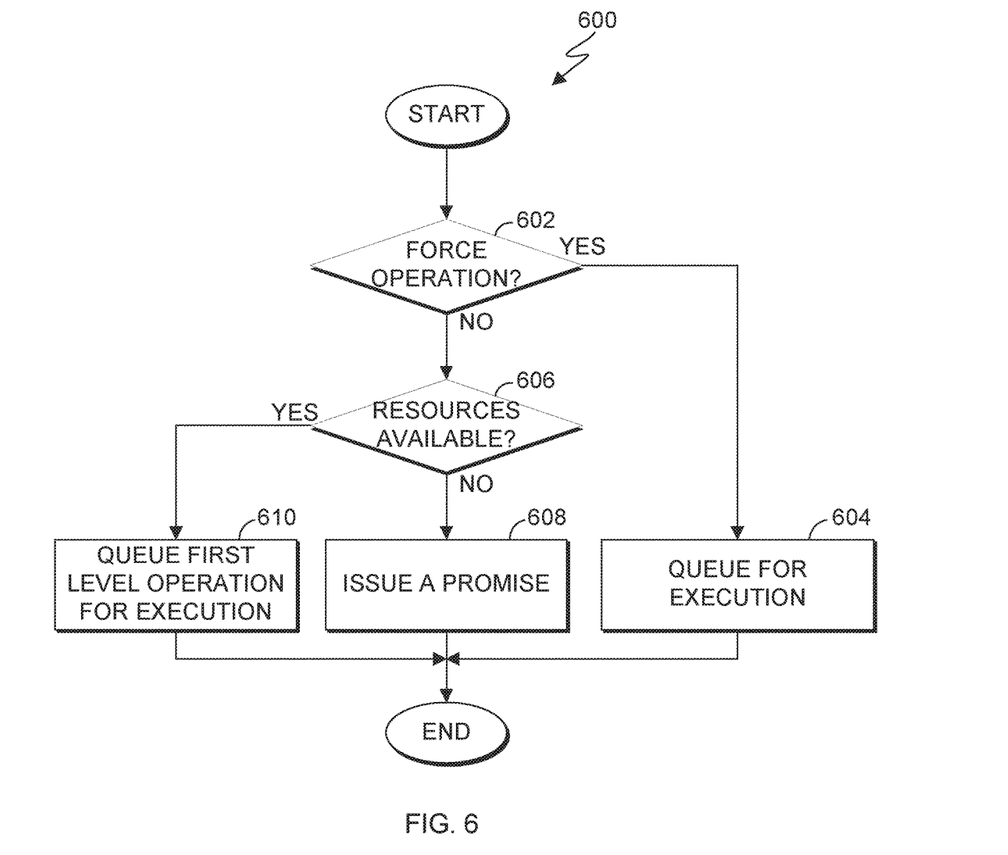
FIG. 6 is a flowchart illustrating operational steps for determining an evaluation strategy, in accordance with an embodiment of the present invention.

FIG. 6 is a flowchart 600 illustrating operational steps for determining an evaluation strategy, in accordance with an embodiment of the present invention. For example, the operational steps of flowchart 600 can be performed at step 504 of flowchart 500.

In step 602, evaluator mod 406 determines whether to force an operation. In this embodiment evaluator mod 406 determines whether to force an operation based, on the type of expression and/or program instructions. For example, evaluator mod 406 always forces primitive expressions (e.g., add, subtract, multiply, divide, etc.).

Evaluator mod 406 can also determine whether to force an operation based on user input. For example, a user can choose to manually force an expression that would have otherwise have been issued a promise. Responsive to receiving a user request to force an operation, evaluator mod 406 can transmit a request to force an operation. In this embodiment, force operations are performed on physical server 308 by a combination of hypervisor 314, and virtual servers 310a and 310b.

If, in step 602, evaluator mod 406 determines that an operation should be forced, then, in step 604, evaluator mod 406 queues the expression for execution. Accordingly, evaluator mod 406 can transmit a notification to force operator mod 410 to perform force operations. Force operator mod 410 can then return the computed value as previously discussed with regard to step 506 of flowchart 500.

If, in step 602, evaluator mod 406 determines that an operation should not be forced, then, in step 606, evaluator mod 406 determines whether resources (e.g., CPU, memory, network, I/O, etc.) are available. In this embodiment, evaluator mod 406 determines that resources are available by accessing physical server 308 and accessing hypervisor statistics. For example, evaluator mod 406 can query management console 302 and/or hypervisor 314 which are capable of monitoring and reporting information about resource availability.

If, in step 606, evaluator mod 406 determines that resources are not available, then, in step 608, delay operator mod 408 issues a promise to evaluate that expression at a later time. For example, the expression can be "3+4" and resources are not available to complete the operation. Delay operator mod 408 can create a promise data structure (e.g., OpportunisticAdd(3, 4)). Accordingly, at some later time, evaluator mod 406 can transmit a notification to force the promise as previously discussed with regard to step 506, of flowchart 500.

If, in step 606, evaluator mod 406 determines that resources are not available, then in step 610, evaluator mod 406 can queue the first level operation for execution. Accordingly, evaluator mod 406 can execute the first level operation and return a promise to evaluate the remainder of the expression as previously discussed with regard to step 506 of flowchart 500.

Figure 7:
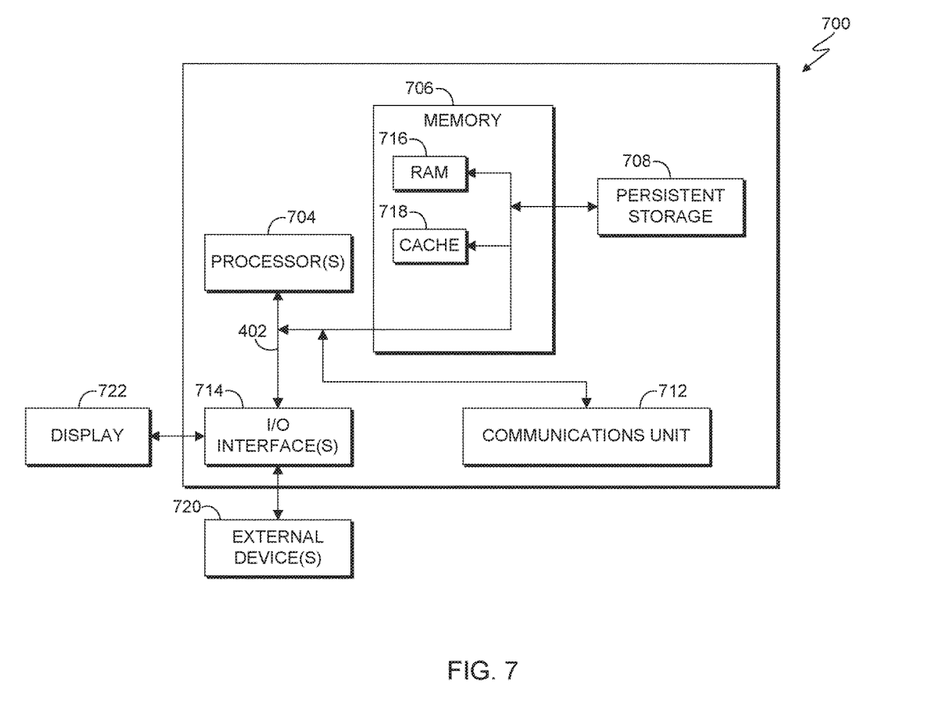
FIG. 7 is a block diagram of internal and external components of the computer systems of FIG. 3, in accordance with an embodiment of the present invention.

FIG. 7 is a block diagram of internal and external components of a computer system 700, which is representative the computer systems of FIG. 1, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 includes communications fabric 702, which provides for communications between one or more processors 704, memory 706, persistent storage 708, communications unit 712, and one or more input/output (I/O) interfaces 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer-readable storage medium that is also part of persistent storage 708.

Communications unit 712 provides for communications with other computer systems or devices via a network (e.g., network 306). In this exemplary embodiment, communications unit 712 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to management console 302 through communications unit 712 (e.g., via the Internet, a local area network or other wide area network). From communications unit 712, the software and data can be loaded onto persistent storage 708.

One or more I/O interfaces 714 allow for input and output of data with other devices that may be connected to computer system 700. For example, I/O interface 714 can provide a connection to one or more external devices 720 such as a keyboard, computer mouse, touch screen, virtual keyboard, touch pad, pointing device, or other human interface devices. External devices 720 can also include portable computer-readable storage media such as, for example, thumb drives, portable optical or magnetic disks, and memory cards. I/O interface 714 also connects to display 722.

Display 722 provides a mechanism to display data to a user and can be, for example, a computer monitor. Display 722 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages (such as the "C" programming language or similar programming languages), and functional programming languages (such as ML, Haskell, Lisp/Scheme, and other similar languages). The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving a set of program instructions having one or more portions to be evaluated in a virtualized environment comprising a plurality of virtual machines and hypervisors;
dynamically determining, in real time, an evaluation strategy based on content of each respective portion of the set of program instructions and on an availability of CPU resources impacted by use of the virtual machines and hypervisors, wherein the evaluation strategy comprises delaying an evaluation of the set of program instructions to be executed by the CPU resources by creating a data structure for a respective portion of the set of program instructions that signifies an expression to be evaluated at a later determined time and forcing evaluation of the created data structure when there are sufficient CPU resources to evaluate at least a created structure;
identifying one or more virtual machines of the plurality of virtual machines having resources to evaluate at least a portion of the set of program instructions; and
allocating one or more of the identified virtual machines to force or delay an evaluation of at least the portion of set of program instructions according to the determined evaluation strategy.

2. The computer-implemented method of claim 1, wherein the determined evaluation strategy comprises:
determining whether there are sufficient CPU resources to evaluate each portion of the set of instructions; and
responsive to determining that there are not sufficient CPU resources available, delaying evaluation of the set of program instructions to be executed by the CPU resources.

3. The computer-implemented method of claim 1, further comprising:
queuing each created data structure for evaluation; and
determining whether there are sufficient CPU resources to evaluate at least a created data structure.

4. The computer-implemented method of claim 1, wherein determining an evaluation strategy based, at least in part, on an availability of CPU resources comprises:
identifying a classification type associated with each respective portion of the set of received program instructions, wherein the classification type is either primitive or complex; and
responsive to determining the classification type associated with each respective portion of the set of received program instructions is primitive, forcing evaluation of each respective portion of the set of program instructions determined to be primitive in a sequential order regardless of availability of CPU resources.

5. The computer-implemented method of claim 4, further comprising:
responsive to determining the classification type associated with each respective portion of the set of received program instructions is complex, determining whether there are sufficient CPU resources available; and
responsive to determining there are sufficient CPU resources available, queuing a portion of the set of program instructions for execution.

6. The computer-implemented method of claim 5, further comprising:

responsive to determining there are insufficient CPU resources available, creating a data structure to signify an expression to be evaluated a later determined time.

7. A computer program product comprising:
one or more computer readable storage media and program instructions stored on the one or more computer readable storage media, the program instructions comprising:
program instructions to receive a set of program instructions having one or more portions to be evaluated in a virtualized environment comprising a plurality of virtual machines and hypervisors;
program instructions to dynamically determine, in real time, an evaluation strategy based on content of each respective portion of the set of program instructions and on an availability of CPU resources impacted by use of the virtual machines and hypervisors, wherein the evaluation strategy comprises program instructions to delay an evaluation of the set of program instructions to be executed by the CPU resources by creating a data structure for a respective portion of the set of program instructions that signifies an expression to be evaluated at a later determined time and forcing evaluation of the created data structure when there are sufficient CPU resources to evaluate at least a created structure;
program instructions to identify one or more virtual machines of the plurality of virtual machines having resources to evaluate at least a portion of the set of program instructions; and
program instructions to allocate one or more of the identified virtual machines to force or delay an evaluation of at least the portion of set of program instructions according to the determined evaluation strategy.

8. The computer program product of claim 7, wherein the determined evaluation strategy comprise:
program instructions to determine whether there are sufficient CPU resources to evaluate each portion of the set of instructions; and
program instructions to, responsive to determining that there are not sufficient CPU resources available, delay evaluation of the set of program instructions to be executed by the CPU resources.

9. The computer program product of claim 7, wherein the program instructions stored on the one or more computer readable storage media further comprise:
program instructions to queue each created data structure for evaluation; and
program instructions to determine whether there are sufficient CPU resources to evaluate at least a created data structure.

10. The computer program product of claim 7, wherein the program instructions to determine an evaluation strategy based, at least in part, on an availability of CPU resources comprise:
program instructions to identify a classification type associated with each respective portion of the set of received program instructions, wherein the classification type is either primitive or complex; and
program instructions to, responsive to determining the classification type with each respective portion of the set of received program instructions is primitive, forcing evaluation of each respective portion of the set of program instructions determined to be primitive in a sequential order regardless of availability of CPU resources.

11. The computer program product of claim 10, wherein the program instructions stored on the one or more computer readable storage media further comprise:
program instructions to, responsive to determining the classification type associated with each respective portion of the set of received program instructions is complex, determining whether there are sufficient CPU resources available; and
program instructions to, responsive to determining there are sufficient CPU resources available, queue a portion of the set of program instructions for execution.

12. The computer program product of claim 11, wherein the program instructions stored on the one or more computer readable storage media further comprise:
program instructions to, responsive to determining there are insufficient CPU resources available, create a data structure to signify an expression to be evaluated a later determined time.

13. A computer system comprising:
one or more computer processors;
one or more computer readable storage media; and
program instructions stored on the one or more computer readable storage media for execution by at least one of the one or more computer processors, the program instructions comprising:
program instructions to receive a set of program instructions having one or more portions to be evaluated in a virtualized environment comprising a plurality of virtual machines and hypervisors, wherein the evaluation strategy comprises program instructions to delay an evaluation of the set of program instructions to be executed by the CPU resources by creating a data structure for a respective portion of the set of program instructions that signifies an expression to be evaluated at a later determined time and forcing evaluation of the created data structure when there are sufficient CPU resources to evaluate at least a created structure;
program instructions to dynamically determine, in real time, an evaluation strategy an evaluation strategy based on content of each respective portion of the set of program instructions and on an availability of CPU resources impacted by use of the virtual machines and hypervisors;
program instructions to identify one or more virtual machines of the plurality of virtual machines having resources to evaluate at least a portion of the set of program instructions; and
program instructions to allocate one or more of the identified virtual machines to force or delay an evaluation of at least the portion of set of program instructions according to the determined evaluation strategy.

14. The computer system of claim 13, wherein the determined evaluation strategy comprise:
program instructions to determine whether there are sufficient CPU resources to evaluate each portion of the set of instructions; and
program instructions to, responsive to determining that there are not sufficient CPU resources available, delay evaluation of the set of program instructions to be executed by the CPU resources.

15. The computer system of claim 13, wherein the program instructions stored on the one or more computer readable storage media further comprise:
program instructions to queue each created data structure for evaluation; and program instructions to determine whether there are sufficient CPU resources to evaluate at least a created data structure.

16. The computer system of claim 13, wherein the program instructions to determine an evaluation strategy based, at least in part, on an availability of CPU resources comprise:
program instructions to identify a classification type associated with each respective portion of the set of received program instructions, wherein the classification type is either primitive or complex; and
program instructions to, responsive to determining the classification type with each respective portion of the set of received program instructions is primitive, forcing evaluation of each respective portion of the set of program instructions determined to be primitive in a sequential order regardless of availability of CPU resources.

17. The computer system of claim 16, wherein the program instructions stored on the one or more computer readable storage media further comprise:
program instructions to, responsive to determining the classification type associated with each respective portion of the set of received program instructions is complex, determining whether there are sufficient CPU resources available; and
program instructions to, responsive to determining there are sufficient CPU resources available, queue a portion of the set of program instructions for execution.

* * * * *